UNITED STATES PATENT OFFICE.

HEINRICH DRESER AND JÜRGEN CALLSEN, OF ELBERFELD, GERMANY, ASSIGNORS TO FARBENFABRIKEN OF ELBERFELD CO., OF NEW YORK, N. Y., A CORPORATION OF NEW YORK.

ATROPINIUM ALKYL NITRATE.

SPECIFICATION forming part of Letters Patent No. 707,402, dated August 19, 1902.

Application filed April 30, 1902. Serial No. 105,333. (No specimens.)

*To all whom it may concern:*

Be it known that we, HEINRICH DRESER, doctor of medicine, professor of pharmacology, and JÜRGEN CALLSEN, doctor of philosophy, chemist, of Elberfeld Germany, (assignors to the FARBENFABRIKEN OF ELBERFELD COMPANY, of New York,) have invented a new and useful Improvement in Atropinium Alkyl Nitrate, of which the following is a specification.

Our invention relates to the preparation of new pharmaceutical products, which are chemically atropinium alkyl nitrates, having the formula:

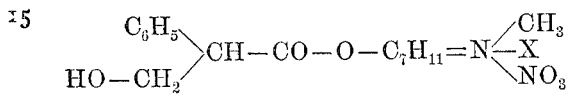

X meaning an alkyl radical, and which, according to our researches, possess valuable therapeutic properties, an average dose being between 0.001 and 0.01 grams.

The process for producing our new compounds consists in either treating atropin with alkyl nitrates or treating the free atropinium alkyl hydroxids with nitric acid or reacting on atropinium alkyl halogenids, such as atropinium methyl iodid and the like with nitrates of metals which yield a but scarcely soluble or insoluble halogenid, (such as silver nitrate, lead nitrate, or the like,) or treating atropinum alkyl sulfates with nitrates of metals which yield a but scarcely soluble or insoluble sulfate, such as the nitrates of alkaline earths, lead nitrate, and the like. The new products thus produced are readily soluble in water and in alcohol and soluble with difficulty in chloroform and ether.

The following examples will serve to illustrate the manner in which our invention can be carried into practical effect. The parts are by weight.

Example 1: Seventeen parts of silver nitrate are added to a solution of 43.1 parts of atropinium methyl iodid in ten times the quantity of water. The silver iodid precipitated during the reaction is filtered off, and the filtered liquid is evaporated *in vacuo.* The new body thus obtained represents white crystals which are readily soluble in water and in alcohol and soluble with difficulty in ether, acetone, and chloroform. When dried at 100° centigrade, it melts at from 163° to 164° centigrade.

Example 2: 43.1 parts of atropinium methyl iodid dissolved in water are transformed into the free ammonium base (atropinium methyl hydroxid) by treatment with moist silver oxid. The precipitate of silver iodid is filtered off, and the filtered liquid is exactly neutralized by means of nitric acid. The atropinium methyl nitrate thus produced is then isolated as described in Example 1.

The processes described in the above examples proceed in an analogous manner if other alkyl halogenids or alkyl hydroxids of atropin be employed.

Example 3: 9.1 parts of ethyl nitrate are added to a solution of 28.9 parts of atropin in one hundred parts of ethyl alcohol, and the resulting mixture is then heated in a closed vessel for two hours to a temperature of about 110° centigrade. On evaporating the atropinium ethyl nitrate is separated, melting at from 116° to 118° centigrade.

Example 4: A watery solution of 26.1 parts of barium nitrate is added to a solution of 73.2 parts of atropinium ethyl sulfate $(C_{17}H_{23}NO_3C_2H_5)_2SO_4$. The barium sulfate which is precipitated during the reaction is filtered off, and on evaporating the filtered liquid the atropinium ethyl nitrate is obtained.

The process proceeds in an analogous manner if in Example 3 instead of ethyl nitrate other alkyl nitrates, or if in Example 4 instead of barium nitrate another nitrate of a metal which yields a but scarcely soluble or insoluble sulfate, be employed.

Having now described our invention and in what manner the same is to be performed, what we claim as new, and desire to secure by Letters Patent, is—

1. The herein-described new atropinium alkyl nitrates having the formula:

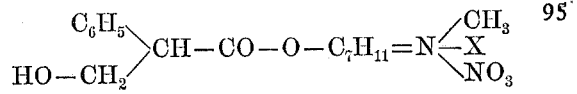

X meaning an alkyl radical, which bodies represent valuable pharmaceutical compounds, being readily soluble in water and in alcohol and soluble with difficulty in chloroform and ether, substantially as hereinbefore described.

2. The herein-described new atropinium methyl nitrate having the formula:

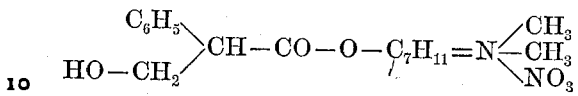

being a white crystalline body melting at from 163° to 164° centigrade, which is readily soluble in water and in alcohol, soluble with difficulty in ether, acetone and chloroform and exhibiting valuable therapeutic properties, substantially as hereinbefore described.

In testimony whereof we have signed our names in the presence of two subscribing witnesses.

HEINRICH DRESER.
JÜRGEN CALLSEN.

Witnesses:
OTTO KÖNIG,
J. A. RITTERSHAUS.